(No Model.) 2 Sheets—Sheet 1.

G. W. W. BILLINGS.
SEEDING MACHINE.

No. 378,758. Patented Feb. 28, 1888.

Witnesses.
J. Edw. Mayben
J. M. Jackson.

Inventor.
G. W. W. Billings.
by
Donald C. Ridout & Co.
Attys (No Model.)  G. W. W. BILLINGS.  2 Sheets—Sheet 2.
SEEDING MACHINE.
No. 378,758.  Patented Feb. 28, 1888.
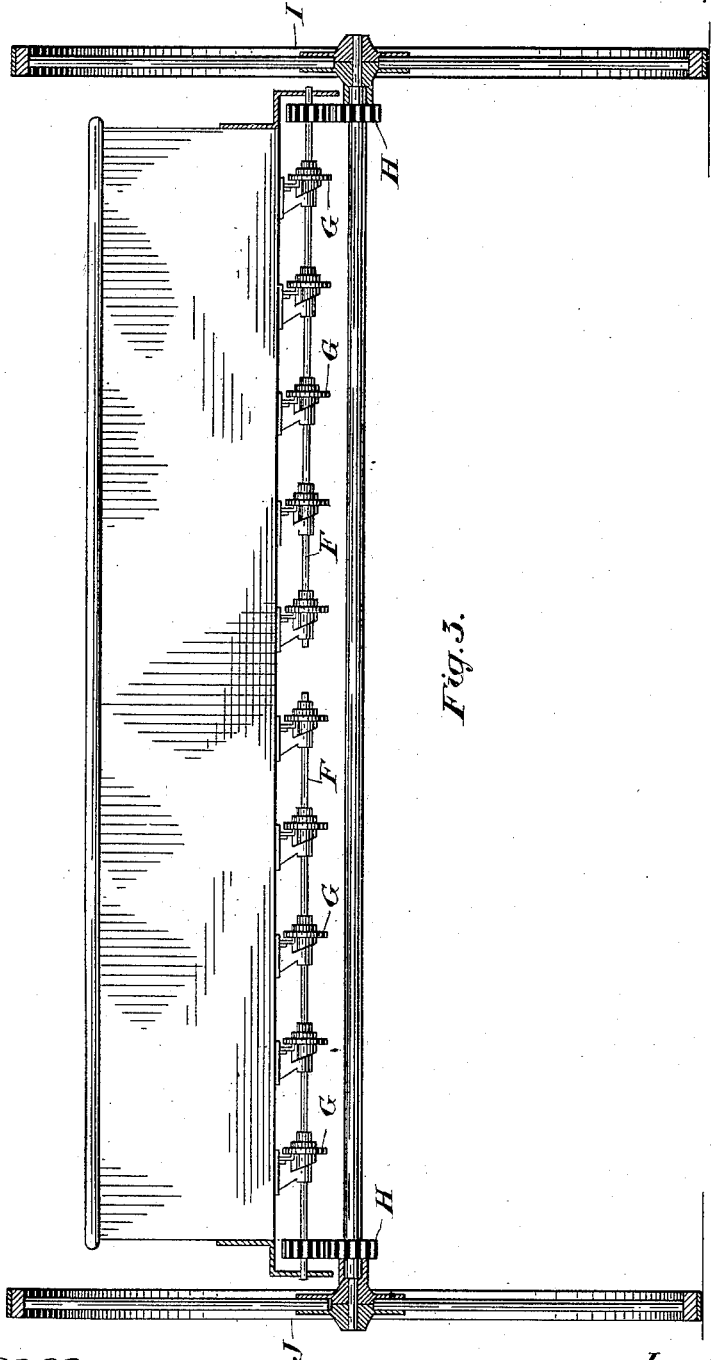
Witnesses.  Inventor.

UNITED STATES PATENT OFFICE.

GEORGE W. W. BILLINGS, OF OSHAWA, ONTARIO, CANADA.

SEEDING-MACHINE.

SPECIFICATION forming part of Letters Patent No. 378,758, dated February 28, 1888.

Application filed November 2, 1887. Serial No. 254,088. (No model.) Patented in Canada September 3, 1885, No. 22,384.

*To all whom it may concern:*

Be it known that I, GEORGE WILLIAM WASHINGTON BILLINGS, of the town of Oshawa, in the county of Ontario, in the Province of Ontario, Canada, joiner, have invented certain new and useful Improvements in Seeding-Machines, of which the following is a specification.

The object of the invention is to provide means for securing the drill-hoe and cultivator-teeth to the drag-bars in such a manner that they may be readily interchanged or the angle of either easily altered without the removal of a single bolt; and it consists in forming on the drill-hoe or cultivator-tooth on one side of its upper end a recess or notch designed to fit onto a hub or projection suitably connected to the drag-bars, and a notch or notches on the opposite side of its upper end to engage with an adjustable roller carried in a head attached to the drag-bars, the whole being arranged and operated substantially as hereinafter more particularly explained.

Figure 1:
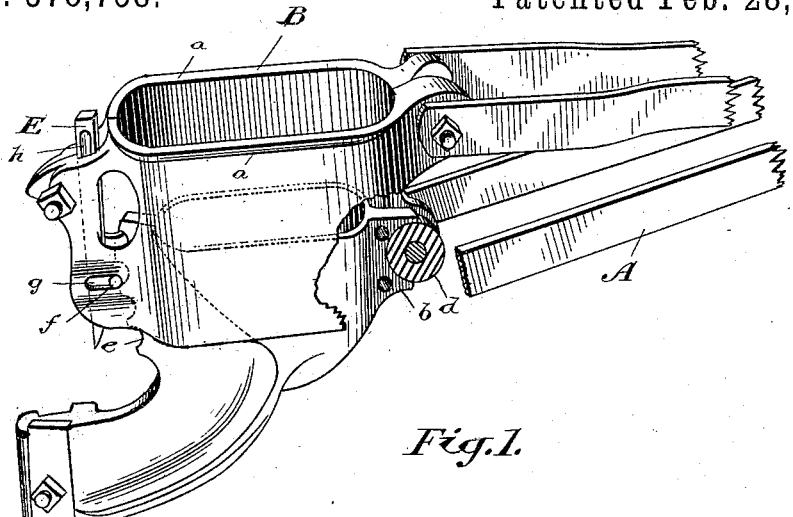
Figure 2:
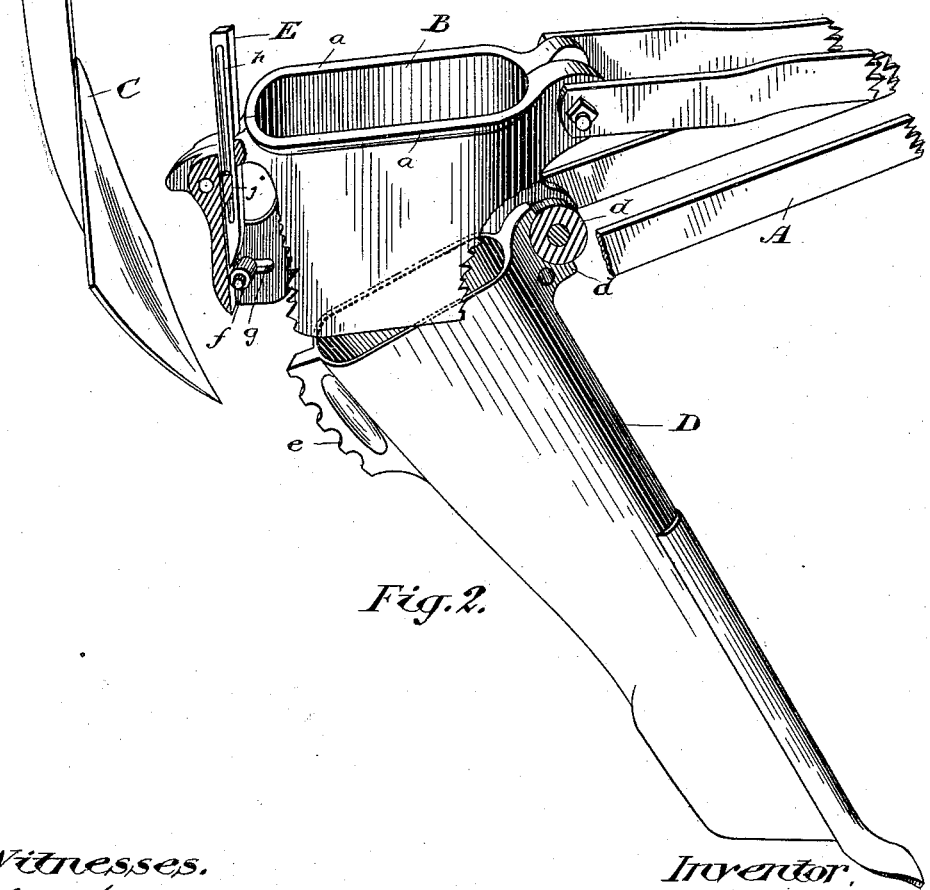

Figure 1 is a perspective view showing my improved cultivator-tooth locked in position. Fig. 2 is a perspective view showing my improved drill-hoe unlocked. Fig. 3 is a rear view of a seeding-machine, showing the feed-rods of the distributers and gearing for operating the same.

In Figs. 1 and 2, A represents the ends of the drag-bars, to which I bolt a hollow head, B. I prefer to make this head in two parts, $a$, and substantially in the shape shown in the drawings, so as to form a socket to receive the upper end of the drill-hoe or cultivator-tooth when either of them are locked in position, as indicated in Fig. 1; but I do not wish to confine myself either to the form shown or to the division represented, as it might be altered considerably in shape, and the two parts might be made in one without in any way affecting the result secured by my invention.

As will be seen on reference to Figs. 1 and 2, the upper end of the cultivator-tooth C is made the same shape as the upper end of the drill-hoe D, and on one side of the upper end of each I form a recess, $b$, designed to fit over the hub or projection $d$, suitably connected to the drag-bar A, or, as shown, formed inside of the head B, which, as before stated, is connected to the drag-bars. As the recess $b$ and hub $d$ are formed merely for the purpose of making a detachable connection between the drag-bars and the hoe or tooth, it will of course be understood that it will answer equally as well to form the hub $d$ on the hoe or tooth and the recess $b$ in the head B, or any other form of bracket connected to the drag-bars A. Near the upper end of the tooth C and the hoe D, on the side opposite to the recess $b$, I form one or more notches, $e$, which are designed to engage with the roller $f$ when the hoe or tooth is set in the position indicated in Fig. 1. This roller $f$, it will be noticed, is set within the head B, and is suitably journaled in the slots $g$, formed in the said head. A taper key, E, is inserted into a slotted passage-way formed in the head B behind the roller $f$ in such a manner that when forced down into the position indicated in Fig. 1 it compresses the roller $f$ forward to engage with any one of the notches $e$ which may at the time be opposite to the said roller $f$. As the hub $d$ forms a pivot-point for the hoe or tooth, and as the adjustment of the key E will cause the roller $f$ to engage with or permit it to withdraw from one of the notches $e$, it follows that the angle of the hoe or tooth may be readily altered, or either may be interchanged with the other without the removal of a single bolt.

In order to prevent the key E being withdrawn from its passage-way in the head B, I form on one or both sides of the said key a longitudinal groove, $h$, into which a small teat, $j$, formed on the head B, projects.

The second portion of my invention, which is illustrated in Fig. 3, consists of a divided feed-rod, F, suitably journaled and connected in the usual manner to the distributers G, so as to operate their feed. One end of the feed-rod F is connected by gearing H to the ground-wheel I, so that it will derive its motion from the said ground-wheel, while the other end of the feed-rod F is connected to the ground-wheel J, from which it derives motion; and as the feed-rod F is divided, as indicated, the distributers connected on one half operate independently of the distributers on the opposite half. It therefore follows that if the machine should be turned the distributers connected to the wheel which may at the time be acting as a pivot will stop feeding, while the distributers connected to the other wheel will be in operation.

What I claim as my invention is—

1. A drill-hoe or cultivator-tooth having formed on one side of its upper end a recess or projection designed to engage with the hub or recess formed upon or connected to the drag-bar, and a notch or notches on the opposite side of its upper end adapted to engage with an adjustable roller carried in a head or bracket attached to the said drag-bar, substantially as and for the purpose specified.

2. A drill-hoe or cultivator-tooth having formed on one side of its upper end a recess or projection designed to engage with a hub or recess formed upon or connected to the drag-bar, and a notch or notches on the opposite side of its upper end, in combination with a roller, $f$, carried in suitable slots, $g$, made in the head B and operated by the key E, substantially as and for the purpose specified.

3. The key E, fitted into a passage-way made in the head B, and having a longitudinal groove, $h$, formed in it to receive the teat $j$, in combination with the roller $f$, suitably supported in the slots $g$, formed in the head B and adapted to engage with one of the notches $e$, substantially as and for the purpose specified.

Oshawa, October 18, 1887.

GEO. W. W. BILLINGS.

In presence of—
R. McGEE,
C. A. JONES.